United States Patent

Aldridge et al.

[11] Patent Number: 6,116,579
[45] Date of Patent: Sep. 12, 2000

[54] TORQUE LIMITING CAM

[75] Inventors: Lawrence C. Aldridge, Walled Lake; Fletcher Bradford Ownbey, Oxford, both of Mich.

[73] Assignee: Valley Industries, Madison Heights, Mich.

[21] Appl. No.: 09/281,657

[22] Filed: Mar. 30, 1999

Related U.S. Application Data

[60] Provisional application No. 60/080,088, Mar. 31, 1998.

[51] Int. Cl.⁷ .................................. B66D 1/20; F16D 7/02
[52] U.S. Cl. ........................ 254/323; 254/903; 464/37; 464/30; 464/101
[58] Field of Search ..................... 254/323, 342, 254/903; 464/30, 37, 45, 46, 77, 100, 101

[56] References Cited

U.S. PATENT DOCUMENTS

| | | | |
|---|---|---|---|
| Re. 33,303 | 8/1990 | Denman et al. | 254/323 |
| 4,043,437 | 8/1977 | Taylor. | |
| 4,532,667 | 8/1985 | Komesker et al. | |
| 4,702,122 | 10/1987 | Richard | 464/37 |
| 4,969,630 | 11/1990 | Denman et al. | 254/323 |
| 5,100,106 | 3/1992 | Denman et al. | 254/323 |
| 5,125,628 | 6/1992 | Rempinski et al. | 254/323 |
| 5,170,676 | 12/1992 | Matouka et al. | 464/37 |
| 5,290,014 | 3/1994 | Fergison, Jr. | 254/342 |
| 5,601,491 | 2/1997 | Chan et al. | 464/37 |

FOREIGN PATENT DOCUMENTS 820 659  11/1951  Germany.

*Primary Examiner*—Katherine A. Matecki
*Attorney, Agent, or Firm*—Rader, Fishman & Grauer PLLC

[57] ABSTRACT

A cam assembly for a hoist mechanism includes a cam member, a pair of springs and an input shaft. The cam member has a cavity defined by an inner periphery of a side wall and floor. Cutout portions extend radially outwardly from the inner periphery of the cavity. The springs include a bow-shaped body portion positioned between first and second connection end members. The body portion further includes an outwardly extending detent, each detent extends into a cutout of the cam member to operatively connect the cam member to the springs. The input shaft has a through hole. The first connection end members of each spring are inserted into the through holes of the input shaft, thereby operatively connecting the springs to the input shaft with a reduced number of components.

13 Claims, 2 Drawing Sheets

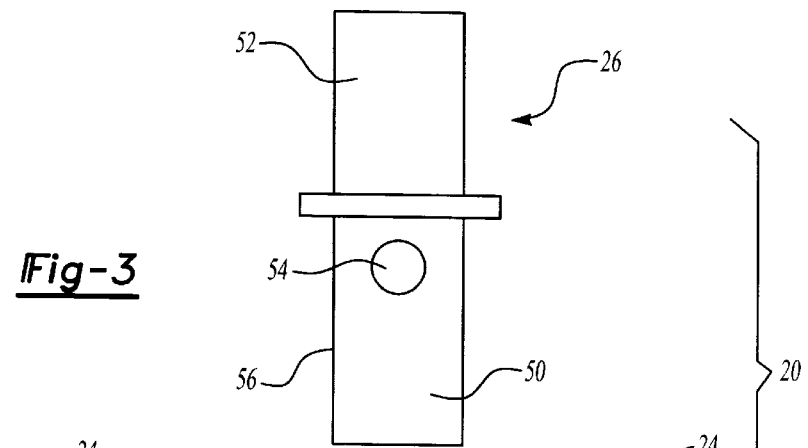
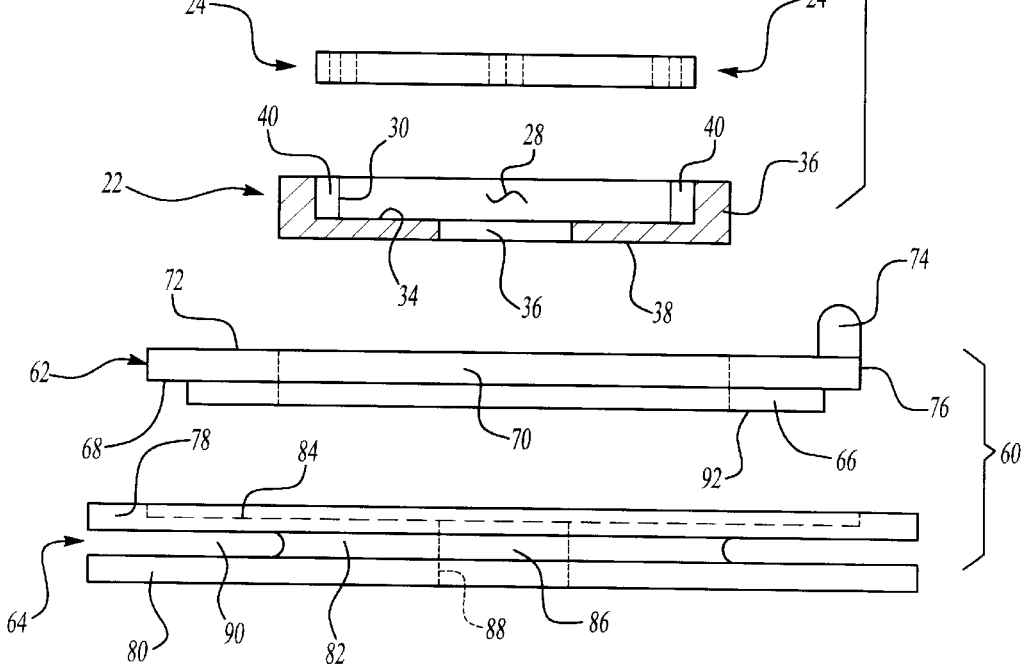
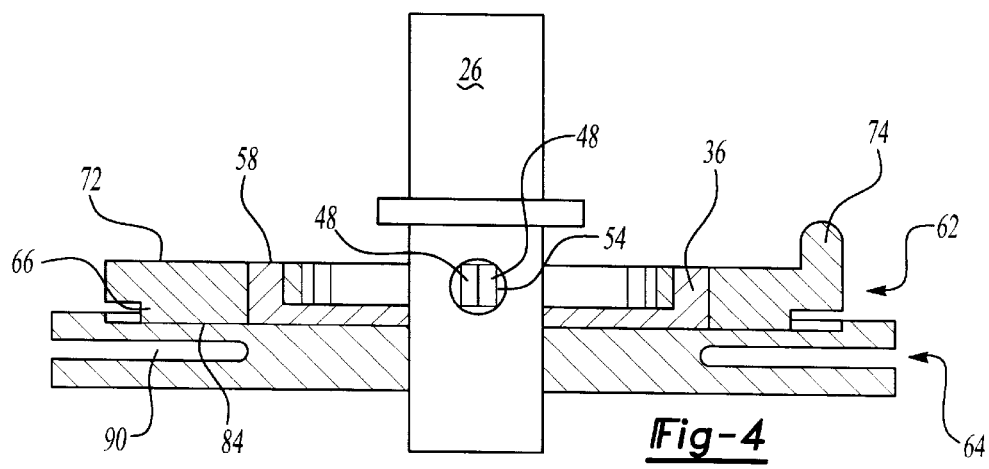

TORQUE LIMITING CAM

CROSS-REFERENCE TO RELATED APPLICATION

This application claims the benefit of U.S. provisional patent application Serial No. 60/080,088, filed Mar. 31, 1998.

FIELD OF THE INVENTION

This invention relates to a cam assembly and more particularly to a torque limiting cam that prevents the over-torque of an input shaft in a hoist mechanism for a tire lift carrier.

BACKGROUND OF THE INVENTION

Cam assemblies are known for providing a torque to wind and unwind a cable in a hoist mechanism such as a tire lift carrier. Known cam assemblies include an input shaft that is connectable to a torque providing drive mechanism that rotates the cam assembly. The cam assembly cooperates with a spool to release or wind up the cable, depending on the direction of rotation. In certain situations, such as when the cable is fully unwound from the spool or when a spare tire is completely in a storage position with respect to an underside of the vehicle, over-torquing of the cam assembly can occur, leading to damage to the drive mechanism or to the hoist mechanism. Known cam assemblies are disadvantageous as there is no means for preventing or alerting a user of the cam assembly over-torquing.

One proposed cam assembly has attempted to overcome the over-torquing problem by incorporating a spring loaded clutch plate that cooperates with an input shaft, a cup-shaped plate, and a cam for winding and unwinding cable. The clutch plate has three rectangular apertures positioned radially and equidistantly from the center of the plate. Each rectangular aperture has a center radial passage that opens from a radially outermost portion of the outer circumference of the plate, the passages being defined by adjacent arcuate edge portions. The clutch plate retains three springs, each having a short outwardly extending central portion. The springs are positioned along the outer circumference of the clutch plate, whereby ends of the springs extend within the radial passages and engage with the rectangular apertures to retain the springs on the clutch plate. The clutch plate is positioned within the cup-shaped plate such that the central portion extends within notches formed within the cup-shaped plate. As the shaft is rotated, the clutch plate rotates due to the central portion's engagement with the notches, thereby rotating the cup-shaped plate and cam relative to the shaft. If the rotation of the cam assembly experiences a resistance that is greater than the maximum limit prescribed by the springs, the central portion of the springs smoothly displace in and out of the plate notches.

One significant drawback to such a cam assembly is the number of components and the machining requirements of the clutch plate. By including so many components, the likelihood of damage to the cam assembly is increased. Further, the assembly time is significantly increased, as are manufacturing costs. In addition, there is no indicator means to alert a user when the cam assembly has exceeded a maximum resistance limit.

Therefore, there exists a need for cam assembly that protects against over-torque with a reduced number of components and further includes an indicator to alert a user when the cam assembly has exceed a maximum level of resistance.

SUMMARY OF THE INVENTION

The present invention is directed to an improved torque limiting cam assembly for use in a hoist mechanism, such as a tire lift carrier. The cam assembly includes a cam member, a pair of cooperation springs and an input shaft. The cam member has an eccentrically positioned cavity defined by an inner peripheral surface of the cam member side wall and a floor. The inner peripheral surface is formed with a pair of opposing arcuate cutout portions that extend radially outwardly from the inner peripheral surface. An aperture extends through the floor of the cavity of the cam member.

The cooperation springs are adapted to be positioned within the cavity of the cam member in an opposing manner. Each spring has a bow shaped portion that is centered between connection end members. The bow shaped portion further includes a radially outwardly offset detent having an apex. Detents are formed so as to partially extend into the cutout portions of the cam member. The connection end members are curved inwardly with respect to the bow shaped portion such that distal ends of the connection end members are in facing relation with one another.

The input shaft includes a first end section, a second end section and a through hole. The first end section is sized so as to be projected through the cam member aperture. The second end section is connectable to a drive mechanism to provide a torque to rotate the cam assembly. The through hole is positioned near the first end section of the shaft and is centered such that it extends perpendicular to and intersects the central axis of the input shaft. The springs are directly connected to the shaft such that the connection end members are receivable within the through hole. Respective connection end members of each spring are positioned in an abutting relation and inserted into the through hole such that the distal ends of each end portion are in a facing relation. By assembling the springs directly to the shaft, the need for a separate clutch plate is eliminated, thereby reducing assembly time, manufacturing costs and inventory control costs.

The cam assembly can be inserted into a hoist mechanism, such as a tire lift carrier. The hoist mechanism includes a drive plate and a spool for winding and unwinding cable. As the input shaft is rotated by a drive mechanism, each detent frictionally engages a side wall of each cutout to rotate the cam member, translating the torque to the drive plate and operating the spool. To prevent over-torquing of the hoist mechanism, the detents of the springs are adapted to somewhat deform and slip from the cutouts when a predetermined maximum operating torque of the spool exceeds the spring constant of the springs, such as when the cable becomes completely unwound or wound up. The shaft and the springs then rotate within the cavity of the cam to prevent damage to the drive mechanism and the hoist mechanism due to over-torque. Preferably, as the detents slip from the cutouts, the apex of each the detent comes into contact with the side wall of a cutout, producing an auditory indicator to alert the user to stop the drive mechanism.

BRIEF DESCRIPTION OF THE DRAWINGS

The features and inventive aspects of the present invention will become more apparent upon reading the following detailed description, claims, and drawings, of which the following is a brief description.

FIG. 3 shows an exploded elevational view of a hoist mechanism having a torque limiting cam assembly in accordance with the present invention.

FIG. 4 shows an elevational view of an assembled hoist mechanism.

DETAILED DESCRIPTION OF PREFERRED EMBODIMENTS

Figure 1:
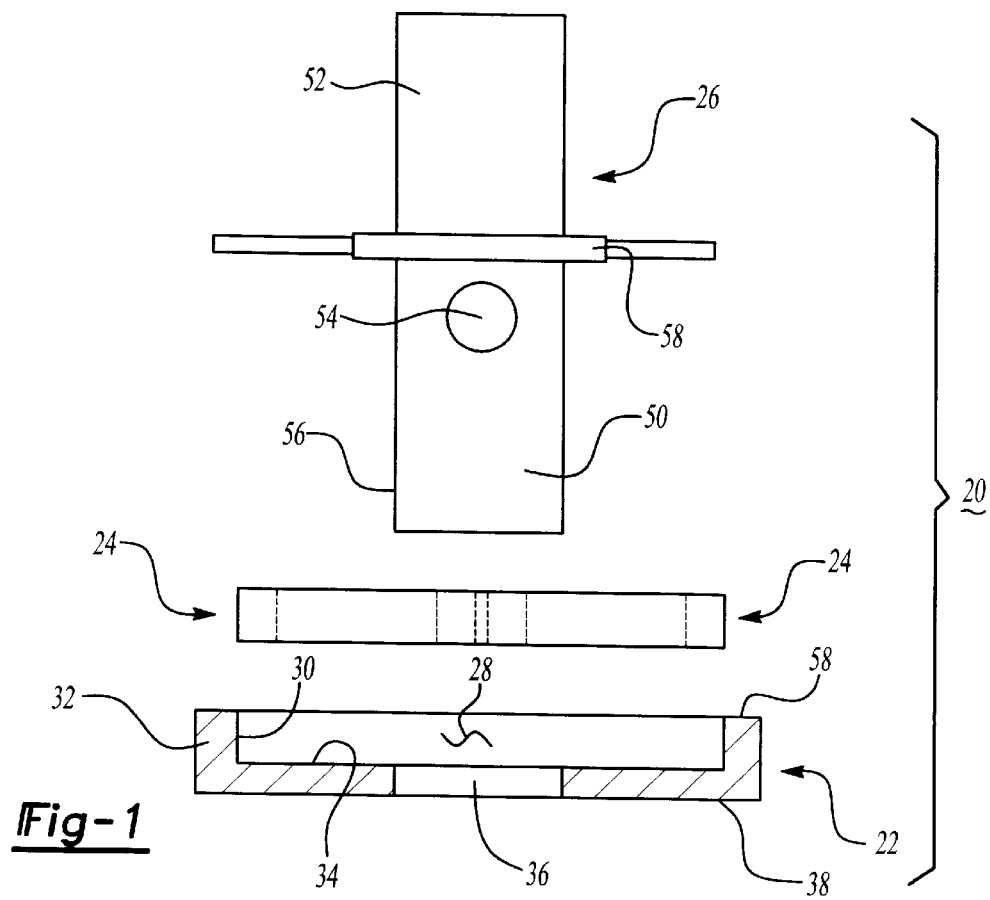
FIG. 1 shows an exploded elevational view of a torque limiting cam assembly in accordance with the present invention.
Figure 2:
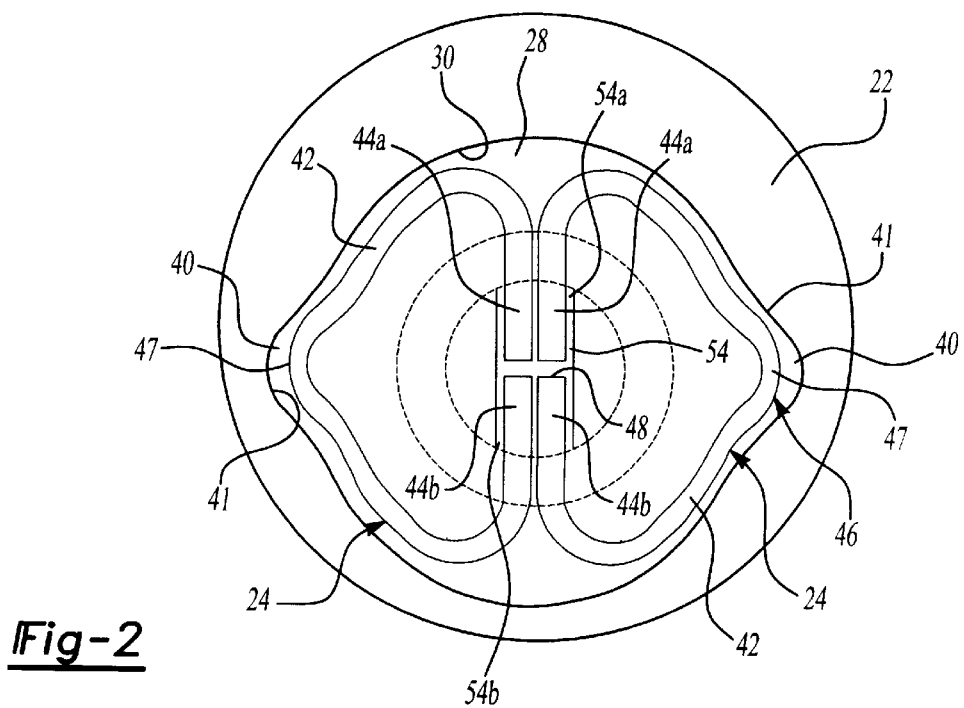
FIG. 2 shows a top view of the torque limiting cam assembly.

FIGS. 1 and 2 show a torque limiting cam assembly 20 according to the present invention. Cam assembly 20 includes a cam member 22, a pair of cooperating springs 24 and an input shaft 26. Cam member 22 includes an eccentrically positioned cavity 28 that is generally circular in shape. Cavity 28 is defined by an inner peripheral surface 30 of a cam member side wall 32 and a floor 34. An aperture 36 extends through a bottom surface 38 of the cam member 22 into cavity 28. Aperture 36 is preferably positioned at approximately the center of cavity 28. Inner peripheral surface 30 further includes one or more arcuate cutouts 40, as best seen in FIG. 2, defined in part by cutout side walls 41. Cutouts 40 are formed extending radially outwardly from inner peripheral surface 30. In a preferred embodiment, inner peripheral surface 30 includes a pair of cutouts that are formed so as to be opposing.

Springs 24 are substantially identical in size and shape and each includes a bow shaped portion 42 that is centered between connection end members 44a and 44b. The radius of each bow shaped portion 42 is slightly smaller than the radius of cavity 28, such that springs 24 may be easily assembled within cavity 28. Each bow shaped portion 42 further includes a radially outwardly extending detent 46 that has a radius substantially smaller than the radius of bow shaped portion 42, forming an apex 47 as best seen in FIG. 2. Detents 46 are sized such that apex 47 partially extends within cutouts 40 when springs 24 are arranged in within cam member 22. Connection end members 44a and 44b curve inwardly with respect to bow shaped portion 42 such that distal ends 48 of connection end members 44a and 44b of each spring 24 are in facing relation with one another.

Input shaft 26 includes a first end section 50, a second end section 52 and openings 54a and 54b positioned on first end section 50. In a preferred embodiment, openings 54a and 54b, as best seen in FIG. 2, define a through hole 54 that is positioned so as to extend perpendicular to and intersecting a central axis of the input shaft. Shaft 26 has a stepped diameter such that first end section 50 has a slightly larger diameter than that of second end section 52. First end section 50 is sized so as to have an outer peripheral surface 56 with a diameter that is slightly smaller than the diameter of aperture 36 in cam member 22 such that first end section 50 may be easily projected through aperture 36. Second end section 52 is connectable to a drive mechanism (not shown). Connection end members 44a and 44b of each spring 24 are receivable within through hole 54. Input shaft 26 may further include a shoulder 58. Shoulder 58 cooperates with floor 34 to secure springs 24 within cavity 28 and prevent vertical displacement of springs 24 during operation of cam assembly 20. In one embodiment, shoulder 58 has a radius that is substantially smaller than the radius of cam member 22. However, it is contemplated that shoulder 58 may have a radius that is generally equal or greater than that of cam member 22 such that springs 24 are protected against possible damage when input shaft 26 is assembled with cam member 22 and springs 24. In addition, shoulder 58 may operate as a support flange for supporting a connection element to facilitate connection of the drive mechanism to input shaft 26.

To assemble cam assembly 20, connection end members 44a from each spring 24 are positioned adjacent one another in an abutting relationship and inserted into opening 54a of shaft 26. Similarly, connection end members 54b of each spring are positioned adjacent one another in an abutting relationship and inserted into opening 54b, such that springs 24 are arranged in an opposing manner so as to be mirror images of one another and distal ends 48 of each end portion 44a and 44b, respectively, are in facing relationship. Through hole 54 may be chamfered to aid in insertion of connection end members 44 in through hole 54. By assembling springs 24 directly to input shaft 26, the need for a separate clutch plate is eliminated. The elimination of a clutch plate is highly desirable as it reduces manufacturing costs associated with production of the clutch plate, as well as reducing assembly time of the cam assembly 20 and inventory control costs.

After springs 24 are operatively connected to input shaft 26, springs 24 and input shaft 26 are engaged with cam member 22. Shaft 26 is projected through aperture 36 such that first end 50 extends through bottom surface 38. Springs 24 are positioned within cavity 28 with apexes 47 of detents 46 extending partially within cutouts 40 to operatively connect cam member 22 to input shaft 26. Preferably, springs 24 are fully seated within cam member 22 such that springs 24 do not extend over a top surface 58 of cam member 22, thereby eliminating the likelihood of damage to springs 24 during operation of cam assembly 20. Operation of cam assembly will be explained below in further detail.

Cam assembly 20 is preferably used in a hoist mechanism 60, as that seen in FIGS. 3 and 4. Hoist mechanism 60 includes a drive plate 62 and a spool 64. Drive plate 62 has an external drive gear 66 extending from a bottom surface 68 of drive plate 62. An aperture 70 extends through drive plate 62 and external drive gear 66. Aperture 70 has a predetermined diameter and depth that is approximately equal to the diameter and height of cam member 22 such that cam member 22 may be fully seated within drive plate 62. A top surface 72 of drive plate 62 further includes an extending drive member 74 to permit manual operation of the hoist mechanism. Drive member 74 is preferably located adjacent to an outer peripheral surface 76 of drive plate 62 so as to be easily accessible.

Spool 64 includes a first plate 78 and a second plate 80. A throat portion 82 is positioned between first and second plates 78 and 80. First plate 78 has an internal planetary gear 84 that is adapted to mate and cooperate with external drive gear 66 of drive plate 62 when gears 62 and 66 are assembled together. An aperture 86 extends through first and second plates 78 and 80. Aperture 86 has a predetermined diameter that is approximately equal to the diameter of aperture 36 of cam member 22 such that shaft 26 extends through aperture 86 when cam assembly 20 is operatively connected to hoist mechanism 60. Throat portion 82 is preferably formed having a narrow diameter relative to the respective diameter of first and second plates 78 and 80. Throat portion 82 cooperates with first and second plates 78 and 80 to form a deep radially extending groove 90. Groove 90 is adapted to receive cable or wire (not shown). Preferably, throat portion 82 is contoured to direct the cable to wind around throat portion 82 in an overlapping manner to reduce kinking of the cable as it is being wound or released from spool 64. Further, in the preferred embodiment, spool 64 includes a mechanism (not shown) for securing an end of the cable to spool 64 to prevent complete dislodgment of the cable from spool 64 and permit selective winding and unwinding of the cable.

To assemble hoist mechanism 60, cam assembly 20 is nested within drive plate 62 with first end 50 of input shaft 26 extending beneath a bottom surface 92 of drive plate 62, as seen in FIG. 4. Cam member 22 is positioned in aperture 70 such that top surface 58 of cam member 22 does not extend above top surface 72 of drive plate 62 and bottom surface 38 of cam member 22 does not extend below bottom surface 92. The exterior surface of cam member 22 and the internal surface of drive plate 62 cooperate to produce an interference fit such that cam member 22 is securely retained within drive plate 62. Once cam assembly 20 is nested within drive plate 62, external drive gear 66 is mated with internal planetary gear 84 of spool 64.

Assembled hoist mechanism 60 may be operated by connecting input shaft 26 to a drive mechanism (not shown). The drive mechanism rotates input shaft 26, which in turn causes springs 24 to rotate with input shaft 26. Apexes 47 of detents 46 frictionally engage side walls 41 of cutouts 40 to rotate cam member 22 with input shaft 26. Due to the interference fit between cam member 22 and drive plate 62, the rotation of cam member 22 is translated to drive plate 62. Mated external drive gear 66 and internal planetary gear 84 cooperate to cause spool 64 to rotate, thereby winding or releasing cable from throat portion 82 of spool 64, depending on the direction of rotation of input shaft 26. When a predetermined maximum operating torque occurs that is greater than a spring constant of springs 24, such as, for example, when the cable is completely unwound, detents 46 of springs 24 are deformed, causing detents 46 to slip from cutouts 40 and engage inner peripheral surface 30, such that input shaft 26 and springs 24 rotate within cam member 22, without rotating either cam member 22 or hoist mechanism 60. The deformation of detents 46 serve to prevent over-torquing of hoist mechanism 60, thereby eliminating possible damage to the drive mechanism and gears 66 and 84. Preferably, as detents 46 slip from cutouts 40, apexes 47 of detents 46 contact with side walls 41 of cutouts 40 as springs 24 rotate, producing an auditory indicator to alert a user that the cable is fully wound or unwound.

In an alternative embodiment, hoist mechanism 60 may also be operated by manually rotating drive plate 62. A tool (not shown) may be engaged with drive member 74 to rotate drive plate 62. The rotation of drive plate 62 in turn rotates cam assembly 20 and spool 64.

Preferred embodiments of the present invention have been disclosed. A person of ordinary skill in the art would realize, however, that certain modifications would come within the teachings of this invention. Therefore, the following claims should be studied to determine the true scope and content of the present invention.

What is claimed is:

1. A cam assembly having a predetermined maximum operating torque, comprising:
    a cam member having a cavity defined by a side wall having an inner peripheral surface and a floor having an aperture therethrough, wherein said inner peripheral surface includes at least one cutout portion extending radially outwardly from said inner peripheral surface;
    a plurality of springs disposed within said cavity, each of said springs including at least one connection end member, a body portion and at least one detent extending outwardly from said body portion, wherein each of said detents has an apex that selectively extends into one of said cutout portions in said cavity to operatively connect each of said springs to said cam member; and
    a rotatable input shaft extending through said aperture in said cam member, said input shaft having at least one opening therein, wherein said connection end members are receivable in said opening to operatively connect said springs to said input shaft; and
    wherein an operating torque applied to said input shaft rotates said it, causing said cam member to rotate when said operating torque is less than or substantially equal to said predetermined maximum operating torque, said detents of said each spring deforming when said operating torque exceeds said predetermined maximum operating torque such that said apex of each of said detents disengages from said cutout portion of said cam member when said input shaft rotates said spring, thereby limiting the operating torque of said input shaft to said predetermined maximum operating torque.

2. The cam assembly of claim 1, wherein said cavity is an eccentrically positioned within said cam member, and said at least one cutout portion has an arcuate shape.

3. The cam assembly of claim 2, wherein each of said springs has one detent formed thereon and said cavity includes a pair of cutout portions, wherein said cutout portions are opposing.

4. The cam assembly of claim 1, wherein said input shaft further includes a support flange positioned thereon.

5. The cam assembly of claim 4, wherein said support flange has a radius that is substantially equal to the radius of said cam member, such that said floor of said cavity cooperates with said support flange to prevent vertical displacement of said spring.

6. The cam assembly of claim 1, wherein each of said springs has first and second connection end members, said body portion being positioned between said first and second connection end members, said body portion having a bow-shape defined by a first radius and said detent defined by a second radius, wherein said first radius is greater than said second radius.

7. The cam assembly of claim 6, wherein said plurality of springs includes a pair of identical springs and said input shaft has opposing first and second openings formed therein, said first and second connection end members being arranged in said first and second openings of said input shaft, respectively.

8. A hoist mechanism having a cam assembly, the combination comprising:
    a drive plate having an aperture for receiving said cam assembly in interference fit and a drive gear;
    a spool having a throat portion and a planetary gear, said planetary gear operatively connecting to and mating with said drive gear of said drive plate such that an operating torque applied to said cam assembly rotates said spool; and
    a cable for hoisting objects having one end of said cable fixedly connected to said throat portion;
    wherein said cam assembly includes:
        a cam member having a cavity defined by a side wall having an inner peripheral surface and a floor having an aperture therethrough, wherein said inner peripheral surface includes at least one cutout portion extending radially outwardly from said inner peripheral surface;
        at least one spring disposed within said cavity, said spring including at least one connection end member, a body portion and at least one detent, wherein said detent extends radially outwardly from said body portion and selectively into said cutout portion to operatively connect said spring to said cam member; and a rotatable input shaft extending through said aperture in said cam member, said input shaft having at least one opening therein, wherein said connection end member is received in said opening to operatively connect said spring to said input shaft;

wherein an operating torque applied to said input shaft rotates said input shaft, causing said cam member to rotate when said operating torque is less than or substantially equal to said predetermined maximum operating torque.

9. The hoist mechanism of claim 8, wherein an apex of each of said detents extends partially into said cutout portion and frictionally engages a side wall of said cutout portion to rotate said cam member with said spring when said input shaft is rotated.

10. The hoist mechanism of claim 8, wherein an apex of said detents is deformed when said operating torque exceeds said predetermined maximum operating torque, such that said detent disengages from said cutout portion of said cam member when said input shaft rotates said spring to limit the operating torque of said input shaft.

11. The cam assembly of claim 10, wherein said deformed apex of said detent contacts a side wall of said cutout portion as said spring rotates, producing an auditory indicator that said operating torque exceeds said predetermined maximum operating torque.

12. The hoist mechanism of claim 8, wherein said at least one spring includes a pair of springs and said cavity includes a plurality of cutout portions, each of said springs having first and second connection end members, a bow shaped body portion having a first radius and positioned between said first and second connection end members, and at least one detent having extending radially outwardly from said bow shaped body portion, wherein said first radius is greater than said second radius.

13. The hoist mechanism of claim 12, wherein said input shaft includes a first opening and a second opening, said first connection end members of each spring being positioned adjacent to one another and extending into said first opening of said input shaft, said second connection end member of each spring being positioned adjacent to one another and extending into said second opening of said input shaft to operatively connect said springs to said input shaft such that said pair of springs are opposing.

* * * * *